UNITED STATES PATENT OFFICE.

JOHN McKILLOP, OF BROOKLYN, NEW YORK.

IMPROVED VARNISH FOR PICTURES.

Specification forming part of Letters Patent No. 38,690, dated May 26, 1863.

*To all whom it may concern:*

Be it known that I, JOHN MCKILLOP, of the city of Brooklyn, in the county of Kings and State of New York, have invented a new and improved varnish for lithographs, engravings, show-cards, or other pictures, impressions, or designs on paper, card-board, or other materials of similar nature, and which I term the "Chromo-Fulgent Coating;" and I do hereby declare that the following is a full, clear, and exact statement of the component parts of and manner of compounding and using the same.

Take eight (8) ounces of solid gelatine, add sixty (60) ounces of cold water, and when the gelatine has been thoroughly soaked heat and boil till a perfect mixture is effected. Take also the yolk and glair of five (5) hen's eggs, add eighteen (18) ounces of cold water, and heat the whole well together until thoroughly mixed, and pour the mixture into the hot gelatine solution and stir vigorously until the whole is completely blended. Then strain through a fine cloth and add three-quarters (¾) of an ounce of potash solution of the strength of two (2) parts, by weight, of potash to three (3) parts of water.

The mixture thus prepared is ready for use, and should be used while fresh, as it quickly putrefies. To use it, it is poured on a clean and smooth glass plate of a size not less than that of the surface to be coated in such quantity as to form a thin but perfectly even and uniform coating, and left to become so dry that a touch of the finger will not indent it. The card, picture, or other article to be coated is then moistened with water until its surface is thoroughly damp, but not wet, and in this condition is spread evenly over the coating on the glass plate and left to dry in a room at a temperature of from 60° at 80° Fahrenheit. When it is perfectly dry it can be easily pulled from the plate, bringing with it the coating, which has a beautiful even glazed surface.

The advantage which this varnish possesses over other varnishes composed in part of gelatine is that it is not affected by changes in the temperature or hygrometric condition of the atmosphere. The egg has the effect of making it pliable and preventing it from cracking. The principal effect of the potash is to make it leave the surface of the glass plate easily.

I propose generally to add to the mixture about three-quarters (¾) of an ounce of the extract of gentian root, the object of which is to prevent it from being eaten by persons who may be employed to use it by rendering its taste unpleasant.

The gelatine which I employ is the ordinary refined white gelatine of commerce.

I do not confine myself to the precise proportions herein specified of the several ingredients of which varnish is composed, as these may be to some extent varied without materially altering its character, and I have merely stated those proportions which I consider the best; but

What I claim as my invention, and desire to secure by Letters Patent, is—

The varnish or coating composed of gelatine, eggs, potash, and water, in about the proportions herein specified.

JOHN McKILLOP.

Witnesses:
HENRY T. BROWN,
A. F. SCHLEGEL.